United States Patent
Suzuki et al.

(10) Patent No.: US 12,224,087 B2
(45) Date of Patent: Feb. 11, 2025

(54) STRETCHABLE CABLE

(71) Applicant: Proterial, Ltd., Tokyo (JP)

(72) Inventors: Kanako Suzuki, Tokyo (JP); Seiji Kojima, Tokyo (JP); Tamotsu Kibe, Tokyo (JP); Keisuke Sugita, Tokyo (JP)

(73) Assignee: Proterial, Ltd., Tokyo (JP)

( * ) Notice: Subject to any disclaimer, the term of this patent is extended or adjusted under 35 U.S.C. 154(b) by 96 days.

(21) Appl. No.: 18/155,132

(22) Filed: Jan. 17, 2023

(65) Prior Publication Data
US 2023/0230720 A1 Jul. 20, 2023

(30) Foreign Application Priority Data
Jan. 18, 2022 (JP) .................. 2022-005516

(51) Int. Cl.
*H01B 7/06* (2006.01)
*B25J 19/00* (2006.01)
*H01B 7/02* (2006.01)
*H01B 11/02* (2006.01)
*H01B 11/22* (2006.01)

(52) U.S. Cl.
CPC .......... *H01B 7/065* (2013.01); *B25J 19/0025* (2013.01); *H01B 7/02* (2013.01); *H01B 11/02* (2013.01); *H01B 11/22* (2013.01)

(58) Field of Classification Search
None
See application file for complete search history.

(56) References Cited

U.S. PATENT DOCUMENTS

| | | | | |
|---|---|---|---|---|
| 366,174 A * | 7/1887 | Kruesi | ................. | H01B 11/002 174/29 |
| 1,978,591 A * | 10/1934 | Meiwald | .................. | A43D 1/02 174/113 C |
| 3,299,375 A * | 1/1967 | Thompson | ............... | H01B 7/06 174/69 |
| 4,146,302 A * | 3/1979 | Jachimowicz | ......... | G02B 6/443 156/173 |
| 5,321,310 A * | 6/1994 | Mizuki | ..................... | H01F 5/00 174/117 FF |
| 2002/0070046 A1* | 6/2002 | Cardinaels | ........... | H02G 15/188 174/68.1 |

FOREIGN PATENT DOCUMENTS

| | | | |
|---|---|---|---|
| JP | 20080093660 A | * | 10/2008 |
| JP | 2018-109608 A | | 7/2018 |
| KR | 20100126833 A | * | 12/2010 |

* cited by examiner

*Primary Examiner* — Krystal Robinson
(74) *Attorney, Agent, or Firm* — Studebaker & Brackett PC

(57) ABSTRACT

A stretchable cable is provided that allows an extra length to be reduced when routed in a movable part. The stretchable cable includes an elastically deformable hollow insulation having a hollow portion that is continuous along a cable longitudinal direction, and at least one electricity- or light-conducting wire-shaped body provided in a spiral shape along the cable longitudinal direction and fixed to the hollow insulation to stretch and contract together with the hollow insulation. The cable is elongated not less than 1.2 times when a tensile force is applied, and the cable returns to an original length when the tensile force is removed.

14 Claims, 3 Drawing Sheets

STRETCHABLE CABLE

CROSS-REFERENCE TO RELATED APPLICATIONS

The present patent application claims the priority of Japanese patent application No. 2022-005516 filed on Jan. 18, 2022, and the entire contents thereof are hereby incorporated by reference.

TECHNICAL FIELD

The present invention relates to a stretchable cable.

BACKGROUND ART

Cables routed, e.g., through movable parts, such as joints, of industrial robots are repeatedly bent or twisted by repetitive movement of the movable parts. Such cables configured to be routed through the movable parts generally routed with an extra length so that an excessive tensile force (i.e., tension) does not act on the cables when the movable parts are moved.

In this regard, Patent Literature 1 is a prior art document related to the invention of the present application.

CITATION LIST

Patent Literature

Patent Literature 1: JP 2018-109608A

SUMMARY OF INVENTION

In recent years, industrial robots have been reduced in size, and along with this, wiring spaces in movable parts have become very narrow. For this reason, if a long extra length is provided when routing a cable through a movable part, an extra length portion may repeatedly come into contact with surrounding members as the movable part moves, resulting in the cable being damaged due to such contact or a kink occurs due to lack of space for the cable to escape.

Therefore, it is an object of the invention to provide a stretchable cable that allows an extra length to be reduced when routed in a movable part.

To solve the problem described above, the invention provides a stretchable cable, comprising:
an elastically deformable hollow insulation comprising a hollow portion continuous along a cable longitudinal direction; and
at least one electricity- or light-conducting wire-shaped body being provided in a spiral shape along the cable longitudinal direction and fixed to the hollow insulation to stretch and contract together with the hollow insulation,
wherein an entire part of the cable is elongated not less than 1.2 times when a tensile force is applied, and the cable returns to an original length when the tensile force is removed.

ADVANTAGEOUS EFFECTS OF INVENTION

According to the invention, it is possible to provide a stretchable cable that allows an extra length to be reduced when routed in a movable part.

BRIEF DESCRIPTION OF DRAWINGS

FIGS. 1A and 1B are diagrams illustrating a stretchable cable in an embodiment of the present invention, wherein FIG. 1A shows the external appearance before and after stretching and FIG. 1B is a cross-sectional view perpendicular to a cable longitudinal direction.

DESCRIPTION OF EMBODIMENTS

Embodiment

An embodiment of the invention will be described below in conjunction with the appended drawings.

Figure 1A:
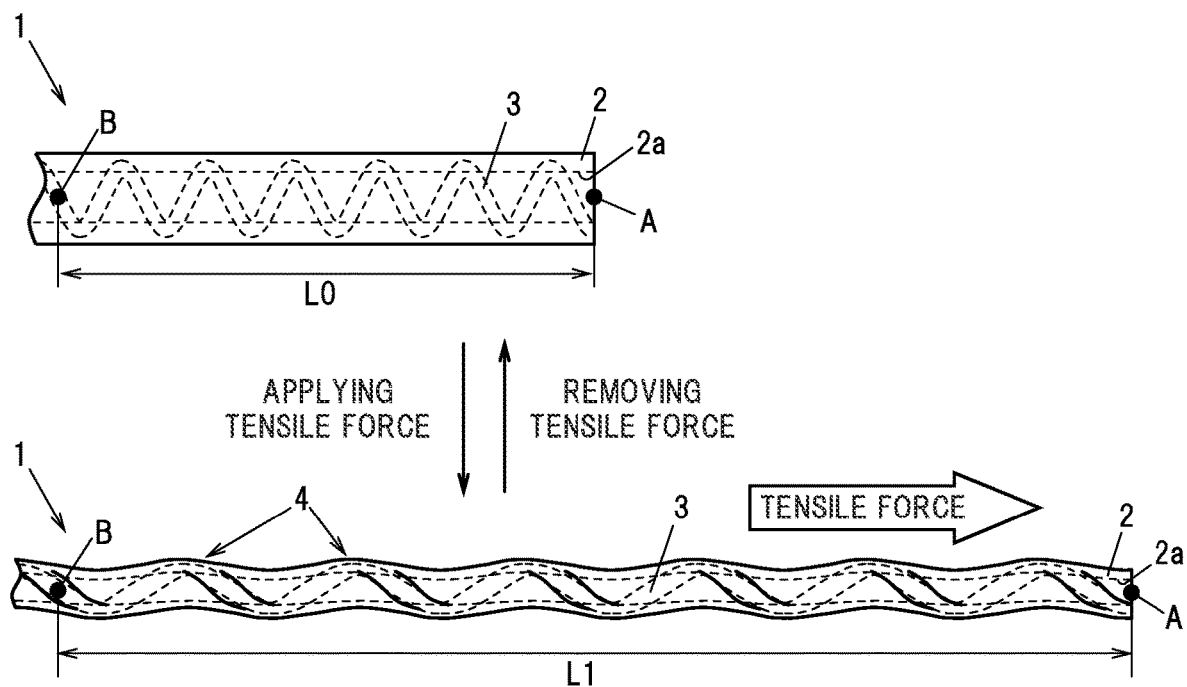
Figure 1B:
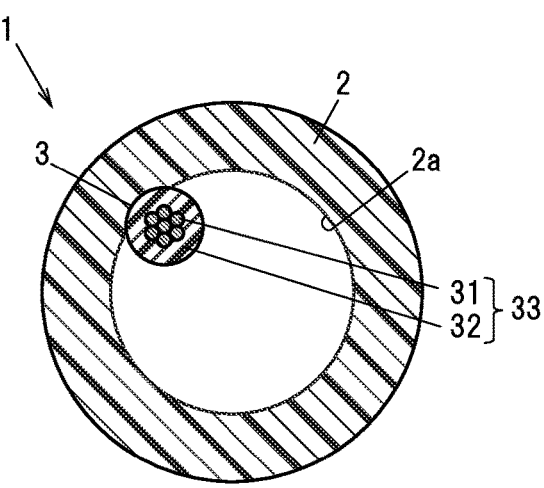

FIGS. 1A and 1B are diagrams illustrating a stretchable cable in the present embodiment, wherein FIG. 1A shows the external appearance before and after stretching and FIG. 1B is a cross-sectional view perpendicular to a cable longitudinal direction.

As shown in FIGS. 1A and 1B, a stretchable cable 1 includes a hollow insulation 2 having a hollow portion 2a continuous along a cable longitudinal direction, and at least one wire-shaped body (i.e., fibrous member) 3 provided in a spiral shape along the cable longitudinal direction. The stretchable cable 1 is used as, e.g., a wiring member to be routed through a movable part of an industrial robot.

The hollow insulation 2 has a circular cross-sectional shape perpendicular to the cable longitudinal direction. The hollow portion 2a having a circular cross-sectional shape perpendicular to the cable longitudinal direction is formed at the center portion of the hollow insulation 2, i.e., at the center portion of the stretchable cable 1. A portion of the hollow insulation 2 not in contact with (i.e., free of direct contact with) the wire-shaped body 3 has a substantially constant thickness. In the present embodiment, the hollow insulation 2 having an inner diameter of 2.7 mm and an outer diameter of 3.5 mm was used in a no-load (i.e., unloaded) state with no tensile force, etc., acting.

The hollow insulation 2 is made of an elastically deformable material. In more particular, the hollow insulation 2 is preferably made of a material having an elongation of not less than 300% and not more than 500%. The hollow insulation 2 is more preferably stretchable with a relatively small tensile force, and the hollow insulation 2 is more preferably made of a material having a stress of not more than 3 MPa at an elongation of 100%.

To satisfy the above characteristics, the hollow insulation 2 is preferably made of a thermoplastic material including a rubber component, or a material obtained by cross-linking the thermoplastic material including a rubber component. As the rubber component used for the hollow insulation 2, ethylene-propylene rubber, ethylene-1-octene copolymer elastomer (EOR), ethylene-1-butene copolymer elastomer (EBR), styrene-based elastomer, natural rubber, chloroprene rubber, butyl rubber, urethane rubber, silicon rubber, and fluoro-rubber, etc. may be used. The hollow insulation 2 preferably includes not less than 50 mass% and not more than 100 mass% of the rubber component listed above.

As materials of the hollow insulation 2 other than the rubber component, e.g., olefin-based resins such as polyethylene and polypropylene, engineering plastics such as polyphenylene ether (PPE), and polyvinyl chloride (PVC), etc. may be used to prevent tackiness. Plasticizers, antioxidants, flame retardants, colorants, inorganic fillers, and processing aids, etc., may be added as other additives used for the hollow insulation 2. To cross-link the hollow insulation 2, it is possible to use, e.g., cross-linking by exposure to electron beam, or cross-linking with a chemical cross-linking agent or a silane coupling agent, etc.

The wire-shaped body 3 conducts electricity or light. In other words, the wire-shaped body 3 transmits electrical signals or optical signals. The wire-shaped body 3 used here is an insulated wire 33 including a conductor 31 composed of a stranded conductor formed by twisting plural metal strands, and an insulation 32 covering around the conductor 31.

However, the wire-shaped body 3 is not limited to the insulated wire 33, and may be consisted of, e.g., the conductor 31 or may be composed of optical fibers. Meanwhile, a solid conductor (i.e., a single conductor) may be used as the conductor 31. In the present embodiment, the conductor 31 composed of a stranded conductor formed by twisting seven metal strands and having an outer diameter of 0.3 mm was used. The insulation 32 may be made of, e.g., ethylene-propylene rubber, ethylene-1-octene copolymer elastomer (EOR), ethylene-1-butene copolymer elastomer (EBR), styrene-based elastomer, natural rubber, chloroprene rubber, butyl rubber, urethane rubber, silicon rubber, or fluoro-rubber, etc. In the present embodiment, the insulation 32 being made of styrene-based elastomer and having an outer diameter of 0.8 mm was used.

The wire-shaped body 3 is provided in a spiral shape along the cable longitudinal direction and is fixed to the hollow insulation 2 to stretch and contract together with the hollow insulation 2. The wire-shaped body 3 is arranged to be partially embedded in the hollow insulation 2, and the wire-shaped body 3 and the hollow insulation 2 are in surface contact with each other and are bonded and integrated at this contact surface. In the present embodiment, when viewed in a cross-section perpendicular to the cable longitudinal direction, the wire-shaped body 3 is arranged in such a manner that a portion is exposed inside the hollow portion 2a and the remaining portion is covered with the hollow insulation 2.

In the stretchable cable 1 in the unloaded state with no tensile force, etc., applied, the wire-shaped body 3 includes portions adjacent in a cable circumferential direction and the cable longitudinal direction, and the adjacent portions are separated from each other. The hollow insulation 2 is present between the adjacent portions in the cable circumferential direction and the cable longitudinal direction of the wire-shaped body 3. When a tensile force is applied to the stretchable cable 1, the hollow insulation 2 between the adjacent portions of the wire-shaped body 3 stretches and the entire stretchable cable 1 thereby stretches easily.

When manufacturing the stretchable cable 1, at least one dummy wire is used. Then, after the wire-shaped body 3 is spirally wound around the dummy wire or after the wire-shaped body 3 and the dummy wire are twisted together, the hollow insulation 2 is formed around the wire-shaped body 3 and the dummy wire by extrusion. The hollow insulation 2 and the wire-shaped body 3 are melted and integrated by the heat at the time of forming the hollow insulation 2 and are thereby fixed to each other. Then, after removing the dummy wire, the stretchable cable 1 is obtained.

In the present embodiment, an entire part of the stretchable cable 1 is elongated not less than 1.2 times, preferably twice, more preferably not less than three times when a tensile force is applied, and also, the cable has a restoring force to return to the original length when the tensile force is removed. That is, as shown in FIG. 1A, where a distance between two given points A and B in the longitudinal direction of the stretchable cable 1 before stretching is defined as L0, a distance L1 between the points A and B, when a tensile force is applied to the stretchable cable 1, is not less than 1.2 times, preferably twice, more preferably not less than three times the distance L0, and the distance between the points A and B returns to L0 when the tensile force is removed. In addition, when the tensile force is applied and then removed, the stretchable cable 1 in the present embodiment easily returns not only to the original length but also to the original shape (i.e., a linear shape), hence, the stretchable cable 1 is characterized by being more unlikely to tangle.

Therefore, when, e.g., the stretchable cable 1 is routed through a movable part such as a joint of an industrial robot, the stretchable cable 1 can stretch and contract with the movement of the movable part, eliminating the need to route with an extra length. As a result, even when a wiring space to route the stretchable cable 1 is narrow, the stretchable cable 1 is less likely to come into contact with surrounding members and it is thereby possible to suppress damage on the stretchable cable 1 due to the contact or occurrence of a kink. That is, durability against the movement, such as bending or twisting, of the movable part (i.e., bending resistance or twisting resistance) can be improved by using the stretchable cable 1 as a wiring member for the movable part. In addition, since the wire-shaped body 3 having high rigidity is spirally arranged in the stretchable cable 1, the shape of the entire stretchable cable 1 is maintained by this wire-shaped body 3 and buckling of the stretchable cable 1 is less likely to occur.

Elongation of the stretchable cable 1 can be controlled by the materials used to form the hollow insulation 2 or a spiral pitch or winding diameter, etc., of the spirally arranged wire-shaped body 3. The spiral pitch of the wire-shaped body 3 is a distance along the cable longitudinal direction between points on the wire-shaped body 3 at the same circumferential position when the wire-shaped body 3 is arranged in a spiral shape. The winding diameter of the wire-shaped body 3 is a diameter of a circle traced by the center of the wire-shaped body 3 when the spirally arranged wire-shaped body 3 is viewed in the cable longitudinal direction. In the present embodiment, the spiral pitch was 3.0 mm and the winding diameter was 1.1 mm.

Next, the behavior when the stretchable cable 1 is stretched will be examined in detail. When stretching the stretchable cable 1 by applying a tensile force thereto, the hollow insulation 2 is stretched so that the outer diameter of the hollow insulation 2 becomes smaller than the outer diameter before the stretching. As the stretchable cable 1 is stretched, the wire-shaped body 3 is also stretched, so the spiral pitch of the wire-shaped body 3 increases and the winding diameter decreases. At this time, the wire-shaped body 3 stands out on the outer surface of the hollow insulation 2 in a stretched state since the rigidity of the wire-shaped body 3 is higher than that of the hollow insulation 2. As a result, in the state where the tensile force is applied, a spiral convex portion (i.e., spirally-raised portion) 4 appears on an outer circumferential surface of the stretchable cable 1.

When connecting the stretchable cable 1 to a substrate or a connector, etc., ends of the stretchable cable 1 are processed to expose the wire-shaped body 3 from the hollow insulation 2. At this time, the wire-shaped body 3 is preferably peeled and separated from the hollow insulation 2. Although one wire-shaped body 3 is used in the present embodiment, workability at the time of processing the ends is good, particularly when plural wire-shaped bodies 3 are used since the plural wire-shaped bodies 3 are in a state of being fixed to the hollow insulation 2 and do not come apart during the work of processing the ends.

When a tensile force is continuously applied to the stretchable cable 1 and the stretchable cable 1 is stretched beyond its limit, the hollow insulation 2 breaks first. Then, when the wire-shaped body 3 is stretched to be substantially straight and the tensile force is further applied, the wire-shaped body 3 breaks. In this regard, however, by adjusting the spiral pitch or winding diameter of the wire-shaped body 3 to make the length of the wire-shaped body 3 shorter than the elongation at break of the hollow insulation 2, the mode of breaking can be changed so that the wire-shaped body 3 breaks first and the hollow insulation 2 then breaks. That is, the mode of breaking can be controlled by the elongation of a material used for the hollow insulation 2, or the spiral pitch or winding diameter of the wire-shaped body 3.

Modifications

Figure 2A:
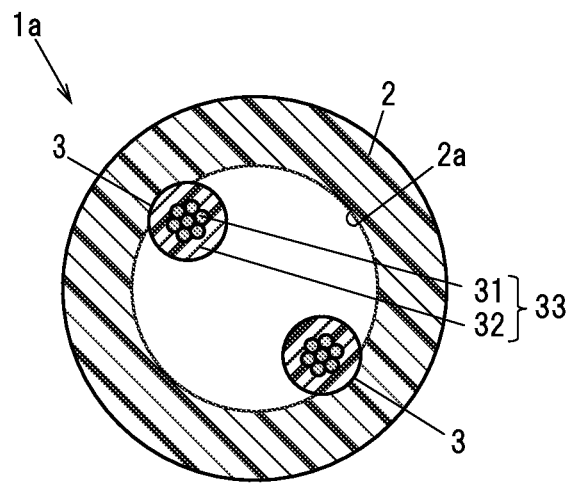
FIGS. 2A and 2B are cross-sectional views showing the stretchable cables in modifications of the invention taken perpendicular to the cable longitudinal direction.
Figure 2B:
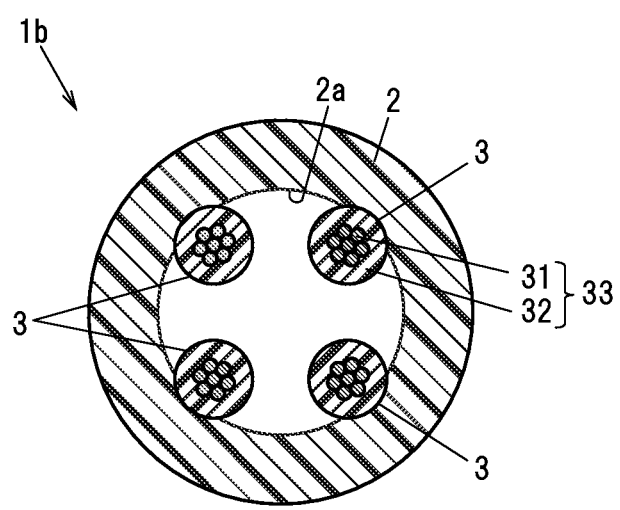

Although one wire-shaped body 3 is used in the present embodiment, the number of wire-shaped bodies 3 is not limited thereto. For example, the number of the wire-shaped bodies 3 to be used may be two as in a stretchable cable 1a shown in FIG. 2A, or may be four as in a stretchable cable 1b shown in FIG. 2B. When plural wire-shaped bodies 3 are used as in the stretchable cables 1a and 1b, the wire-shaped bodies 3 may be arranged at equal intervals in the circumferential direction when viewed in a cross-section perpendicular to the cable longitudinal direction. For example, for the stretchable cable 1a using two wire-shaped bodies 3, it is possible to use the wire-shaped body 3 with an outer diameter of 0.5 mm and the hollow insulation 2 with an outer diameter of 3 mm.

In addition, all the wire-shaped bodies 3 used do not need to have the same outer diameter, and the wire-shaped bodies 3 having different outer diameters may be used. Furthermore, for example, the electric wires used as the wire-shaped bodies 3 do not need to be the insulated wires 33 and, e.g., a coaxial wire may be included. Furthermore, both electric wires and optical fibers may be included as the wire-shaped bodies 3.

Figure 3A:
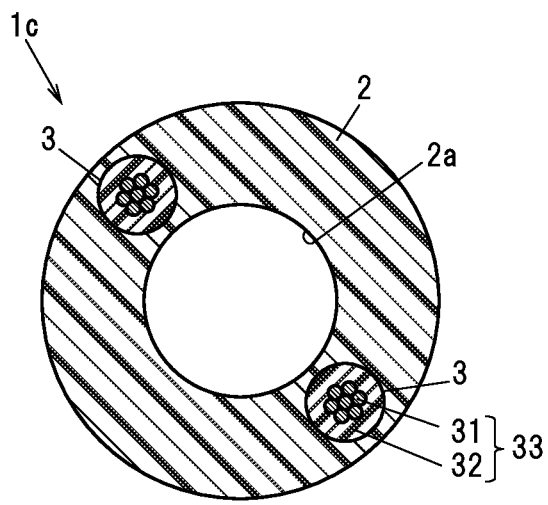
FIGS. 3A to 3C are cross-sectional views showing the stretchable cables in modifications of the invention taken perpendicular to the cable longitudinal direction.
Figure 3B:
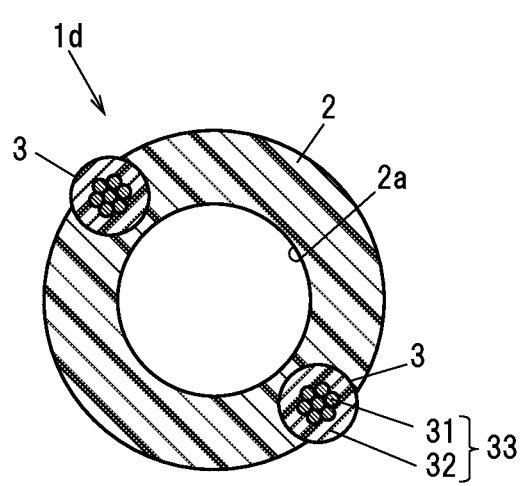

In addition, although the case where the wire-shaped body 3 is partially exposed inside the hollow portion 2a has been described in the present embodiment, the present invention is not limited thereto. For example, the entire portion of the wire-shaped body 3 may be covered with the hollow insulation 2 as in a stretchable cable 1c shown in FIG. 3A, or the wire-shaped body 3 may be arranged in such a manner that a portion is exposed on the outer circumferential surface of the hollow insulation 2 and the remaining portion is covered with the hollow insulation 2 as in a stretchable cable 1d shown in FIG. 3B. Bumps due to the wire-shaped bodies 3 are not present in the hollow portions 2a of the stretchable cables 1c and 1d, which allows a coating to be applied to an inner circumferential surface of the hollow insulation 2. For example, applying a coating to improve slipperiness to the inner circumferential surface of the hollow insulation 2 allows for, e.g., use in catheter applications, etc. Meanwhile, the stretchable cables 1 and 1c in FIGS. 1A, 1B, and 3A have good external appearance since the wire-shaped body 3 does not protrude on the outer circumference surface of the hollow insulation 2, and it is advantageous in that the hollow insulation 2 protects the wire-shaped body 3 from external damage and the wire-shaped body 3 is thus less likely to be damaged.

Figure 3C:
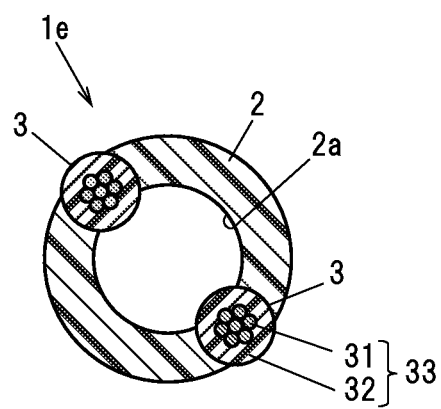

Furthermore, as in a stretchable cable 1e shown in FIG. 3C, the wire-shaped body 3 may be arranged in such a manner that, when viewed in a cross-section perpendicular to the cable longitudinal direction, a portion is exposed inside the hollow portion 2a, another portion is exposed on the outer circumferential surface of the hollow insulation 2, and the remaining portion is covered with the hollow insulation 2. In this example, the wire-shaped bodies 3 are provided to penetrate the hollow insulation 2 in a cable radial direction, hence, the hollow insulation 2 is divided into sections, each of which is located between the circumferentially adjacent wire-shaped bodies 3. The divided section has an arc shape to circumferentially connect between the wire-shaped bodies 3 that are adjacent in the cable circumferential direction. According to the stretchable cable 1e, the outer diameter of the stretchable cable 1 can be reduced, which allows it to be used in a narrower wiring space. In addition, it is easier to separate (peel off) the wire-shaped bodies 3 from the hollow insulation 2, which improves workability during processing the ends. Furthermore, the amount of resin used to form the hollow insulation 2 can be reduced, which allows for reducing cost.

Functions and Effects of the Embodiment

As described above, the stretchable cable 1 in the present embodiment has the hollow insulation 2 which is elastically deformable and includes the hollow portion 2a continuous along the cable longitudinal direction, and at least one electricity- or light-conducting wire-shaped body 3 being provided in a spiral shape along the cable longitudinal direction and fixed to the hollow insulation 2 to stretch and contract together with the hollow insulation 2. An entire part of the cable is elongated not less than 1.2 times when a tensile force is applied, and the cable returns to an original length when the tensile force is removed.

This allows, e.g., an extra length or slack in wiring to be reduced (or the extra length to be eliminated) when routed in a movable part of an industrial robot, etc., and it is thus possible to suppress damage due to repeated contact of the extra length portion with surrounding members or occurrence of a kink due to the presence of the extra length. As a result, it is possible to realize the stretchable cable 1 with high durability against the movement of the movable part (i.e., movement such as bending or twisting) when routed in the movable part. In addition, the use of the stretchable cable 1 also facilitates the design of equipment wiring since it is not necessary to take into account the extra length when designing the wiring.

Intended Use of Stretchable Cable 1

Although the example of using the stretchable cable 1 as a wiring member to be routed through a movable part of an industrial robot has been described in the embodiment, the intended use of the stretchable cable 1 is not limited thereto. The stretchable cable 1 can be used as a wiring member through a movable part of various devices such as industrial equipment, medical device, or home appliance.

The stretchable cable 1 can be also used in applications requiring stretching and contraction of the cable itself. The stretchable cable 1 can be used as, e.g., a wiring member for wearable products such as eyeglasses, wristband, earphones, or clothing, or as a stretchable wiring member for home door or elevator. Furthermore, it can be used as a substitute for a telephone coiled cord. Coiled cords have problems such as tangling and pinching when stretched and returned, but the use of the stretchable cable 1 can eliminate such problems.

Furthermore, the stretchable cable 1 can also be used in applications where cables inherently not stretchable are used. In this case, a certain amount of difference in wiring length can be absorbed by stretching and contraction of the stretchable cable 1. Thus, a stretchable cable assembly having terminal members such as connectors at ends of the stretchable cable 1 is highly versatile, is adaptable to various wiring lengths, and also eliminates the need to prepare many types of cables with different lengths.

Summary of the Embodiment

Technical ideas understood from the embodiment will be described below citing the reference signs, etc., used for the embodiment. However, each reference sign, etc., described below is not intended to limit the constituent elements in the claims to the members, etc., specifically described in the embodiment.

According to the feature [1], a stretchable cable (1) is composed of an elastically deformable hollow insulation (2) including a hollow portion (2a) continuous along a cable longitudinal direction, and at least one electricity- or light-conducting wire-shaped body (3) being provided in a spiral shape along the cable longitudinal direction and fixed to the hollow insulation (2) to stretch and contract together with the hollow insulation (2), wherein an entire part of the cable is elongated not less than 1.2 times when a tensile force is applied, and the cable (1) returns to an original length of the cable (1) when the tensile force is removed.

According to the feature [2], in the stretchable cable (1) described in the feature [1], the entire part of the cable is elongated not less than three times when the tensile force is applied, and the cable (1) returns to the original length of the cable (1) when the tensile force is removed.

According to the feature [3], in the stretchable cable (1) described in the feature [1] or [2], elongation of the hollow insulation (2) is not less than 300%.

According to the feature [4], in the stretchable cable (1) described in any one of the features [1] to [3], the hollow insulation (2) has a stress of not more than 3 MPa at an elongation of 100%.

According to the feature [5], in the stretchable cable (1) described in any one of the features [1] to [4], the wire-shaped body (3) includes portions adjacent in a circumferential direction and the cable longitudinal direction and the adjacent portions are separated from each other.

According to the feature [6], in the stretchable cable (1) described in any one of the features [1] to [5], when viewed in a cross-section perpendicular to the cable longitudinal direction, the wire-shaped body (3) is arranged in such a manner that a portion is exposed inside the hollow portion (2a) and a remaining portion is covered with the hollow insulation (2).

According to the feature [7], in the stretchable cable (1c) described in any one of the features [1] to [5], an entire part of the wire-shaped body (3) is covered with the hollow insulation (2) when viewed in a cross-section perpendicular to the cable longitudinal direction.

According to the feature [8], in the stretchable cable (1d) described in any one of the features [1] to [5], when viewed in a cross-section perpendicular to the cable longitudinal direction, the wire-shaped body (3) is arranged in such a manner that a portion (i.e., a first portion) of the wire-shaped body (3) is exposed on an outer circumferential surface of the hollow insulation (2) and a remaining portion (i.e., a second portion) of the wire-shaped body (3) is covered with the hollow insulation (2).

According to the feature [9], in the stretchable cable (1e) described in any one of the features [1] to [5], when viewed in a cross-section perpendicular to the cable longitudinal direction, the wire-shaped body (3) is arranged in such a manner that a portion (i.e., a first portion) of the wire-shaped body (3) is exposed inside the hollow portion (2a), another portion (i.e., a second portion) of the wire-shaped body (3) is exposed on an outer circumferential surface of the hollow insulation (2), and a remaining portion (i.e., a third portion) of the wire-shaped body (3) is covered with the hollow insulation (2).

According to the feature [10], in the stretchable cable (1) described in any one of the features [1] to [9], the cable (1) is configured to be used as a wiring member to be routed through a movable part of an industrial robot.

Although the embodiment of the invention has been described, the invention according to claims is not to be limited to the embodiment described above. Further, please note that not all combinations of the features described in the embodiment are necessary to solve the problem of the invention. In addition, the invention can be appropriately modified and implemented without departing from the gist thereof.

The invention claimed is:

1. A stretchable cable, comprising:
an elastically deformable hollow insulation comprising a hollow portion continuous along a cable longitudinal direction; and
at least one electricity- or light-conducting wire-shaped body being provided in a spiral shape along the cable longitudinal direction and fixed to the hollow insulation to stretch and contract together with the hollow insulation,
wherein an entire part of the cable is elongated not less than 1.2 times when a tensile force is applied, and the cable returns to an original length of the cable when the tensile force is removed.

2. The stretchable cable according to claim 1, wherein the entire part of the cable is elongated not less than three times when the tensile force is applied, and the cable returns to the original length of the cable when the tensile force is removed.

3. The stretchable cable according to claim 1, wherein elongation of the hollow insulation is not less than 300%.

4. The stretchable cable according to claim 1, wherein the hollow insulation comprises a stress of not more than 3 MPa at an elongation of 100%.

5. The stretchable cable according to claim 1, wherein the wire-shaped body includes portions adjacent in a circumferential direction and cable longitudinal direction and the adjacent portions are separated from each other.

6. The stretchable cable according to claim 1, wherein when viewed in a cross-section perpendicular to the cable longitudinal direction, the wire-shaped body is arranged in such a manner that a first portion of the wire-shaped body is exposed inside the hollow portion and a second portion of the wire-shaped body is covered with the hollow insulation.

7. The stretchable cable according to claim 1, wherein the wire-shaped body is entirely covered with the hollow insulation when viewed in a cross-section perpendicular to the cable longitudinal direction.

8. The stretchable cable according to claim 1, wherein when viewed in a cross-section perpendicular to the cable longitudinal direction, the wire-shaped body is arranged in such a manner that a first portion of the wire-shaped body is exposed on an outer circumferential surface of the hollow insulation and a second portion of the wire-shaped body is entirely covered with the hollow insulation.

9. The stretchable cable according to claim 1, wherein when viewed in a cross-section perpendicular to the cable longitudinal direction, the wire-shaped body is arranged in such a manner that a first portion of the wire-shaped body is exposed inside the hollow portion, a second portion of the wire-shaped body is exposed on an outer circumferential surface of the hollow insulation, and a third portion of the wire-shaped body is covered with the hollow insulation.

10. The stretchable cable according to claim 1, wherein the cable is configured to be used as a wiring member to be routed through a movable part of an industrial robot.

11. The stretchable cable according to claim 1, wherein in the state where a tensile force is applied, a spiral convex portion appears on an outer circumferential surface of the stretchable cable.

12. The stretchable cable according to claim 1, wherein the wire-shaped body is partially embedded in the hollow insulation.

13. The stretchable cable according to claim 12, wherein the wire-shaped body is bonded and integrated at a surface of contact between the partially embedded wire-shaped body and the hollow insulation.

14. The stretchable cable according to claim 1, wherein the wire-shaped body is fixed at a surface of contact between the wire-shaped body and the hollow insulation such that the wire-shaped body does not separate from the hollow insulation when a tensile force is applied to the stretchable cable.

* * * * *